(12) United States Patent
Takahashi

(10) Patent No.: US 12,177,407 B2
(45) Date of Patent: Dec. 24, 2024

(54) IMAGE PROCESSING APPARATUS DISPLAYS USER AUTHENTICATION SCREEN REQUIRING AUTHENTICATION, USER OPERATION ON IMAGE PROCESSING FUNCTIONS SCREEN IS NOT SELECTED, AND SCREEN DISPLAY METHOD

(71) Applicant: CANON KABUSHIKI KAISHA, Tokyo (JP)

(72) Inventor: Kentaro Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,678

(22) Filed: Nov. 23, 2022

(65) Prior Publication Data
US 2023/0171363 A1 Jun. 1, 2023

(30) Foreign Application Priority Data
Nov. 29, 2021 (JP) .................................. 2021-192727

(51) Int. Cl.
*H04N 1/44* (2006.01)
*H04N 1/00* (2006.01)

(52) U.S. Cl.
CPC ....... *H04N 1/4433* (2013.01); *H04N 1/00474* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,060,928 B2* | 11/2011 | Muto | .................... | G06F 21/608 726/16 |
| 2005/0231760 A1* | 10/2005 | Minato | .............. | H04N 1/00472 358/1.15 |
| 2007/0061573 A1* | 3/2007 | Dokuni | ................. | G06F 21/608 713/170 |
| 2015/0324675 A1* | 11/2015 | Morii | ................. | H04N 1/00411 358/1.14 |
| 2016/0098232 A1* | 4/2016 | Sato | ................... | H04N 1/00204 358/1.14 |
| 2017/0011207 A1* | 1/2017 | Takeda | ..................... | G06F 21/31 |
| 2017/0286023 A1* | 10/2017 | Akimoto | ............... | G06F 3/1256 |
| 2018/0081599 A1* | 3/2018 | Yamada | ................ | G06F 3/1239 |
| 2021/0306490 A1* | 9/2021 | Mizuno | ................ | H04N 1/4433 |

FOREIGN PATENT DOCUMENTS

| | | |
|---|---|---|
| JP | 2007079684 A | 3/2007 |
| JP | 2015220720 A | 12/2015 |

* cited by examiner

*Primary Examiner* — Haris Sabah
(74) *Attorney, Agent, or Firm* — Canon U.S.A., Inc., IP Division

(57) ABSTRACT

An image processing apparatus providing a plurality of functions includes a display control unit that, upon receiving an instruction for displaying a screen of a function where use of the function requires authentication, displays the screen of the function requiring authentication in a state where a user operation on the screen of the function is not received, wherein the display control unit enables receipt of a user operation on the screen of the function in a case where a user is successfully authenticated and authorized to use the function.

12 Claims, 19 Drawing Sheets

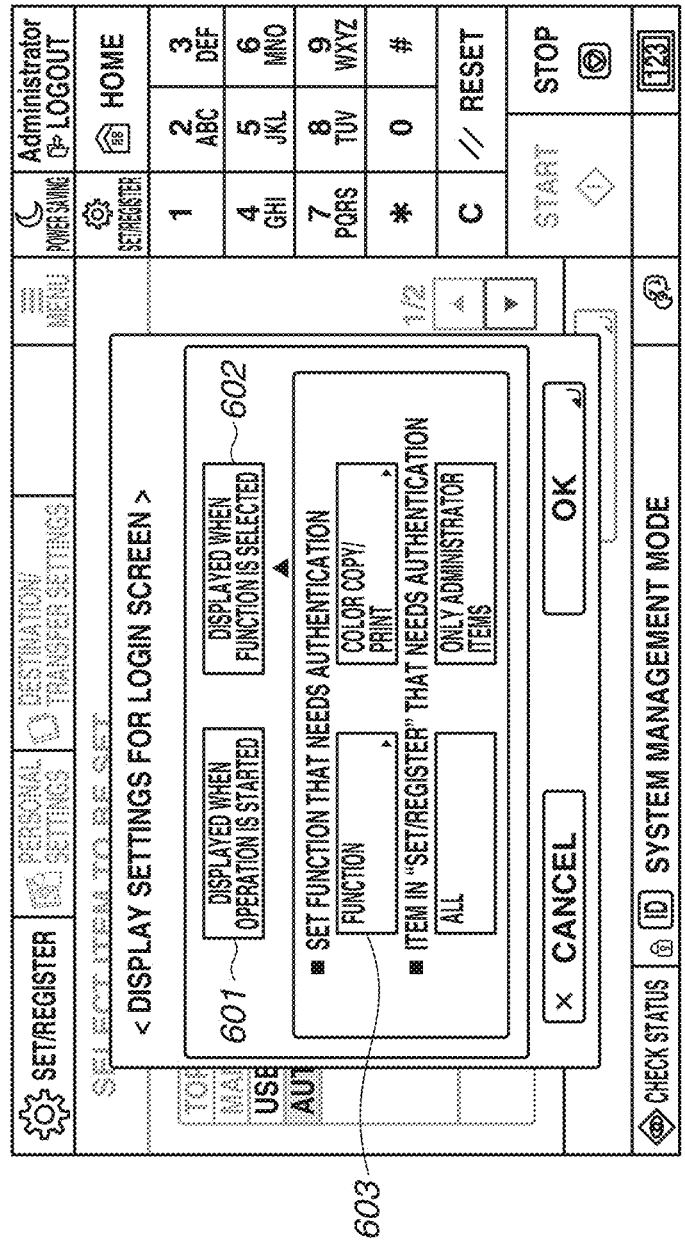

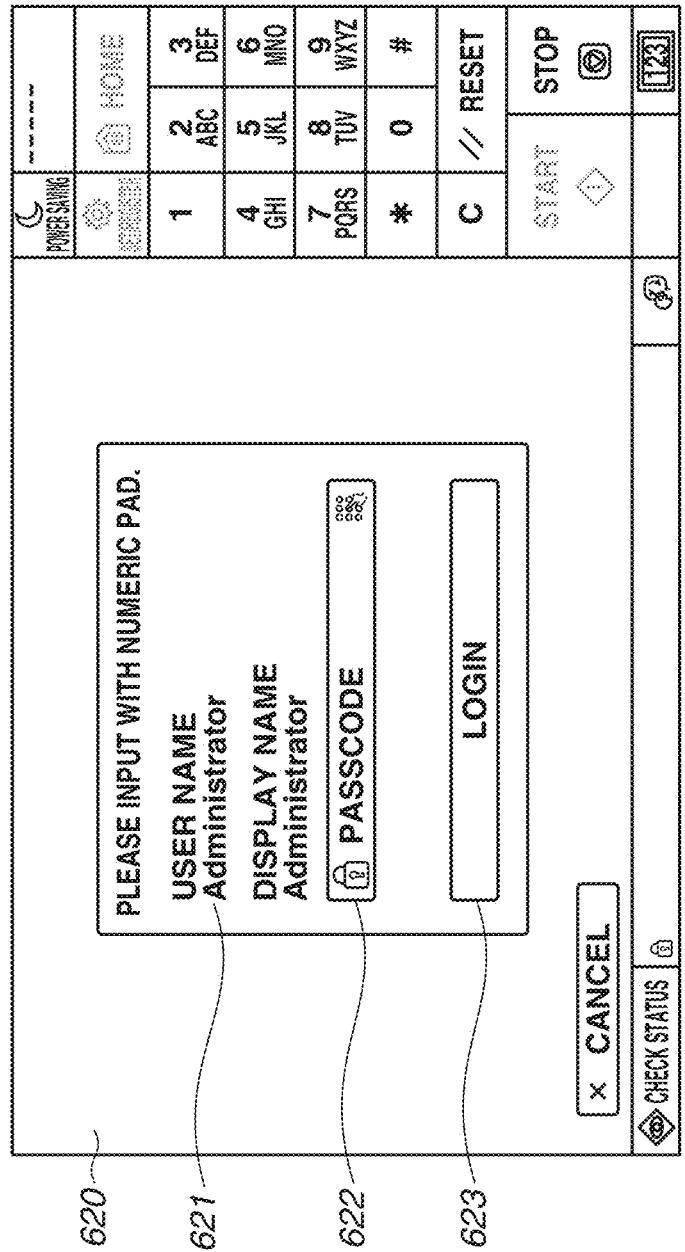

FIG.7

|  | DISPLAY HAS SECURITY ISSUE? |
|---|---|
| COPY | WITHOUT ISSUE |
| SCAN AND SEND | WITHOUT ISSUE |
| FAX | WITH ISSUE |

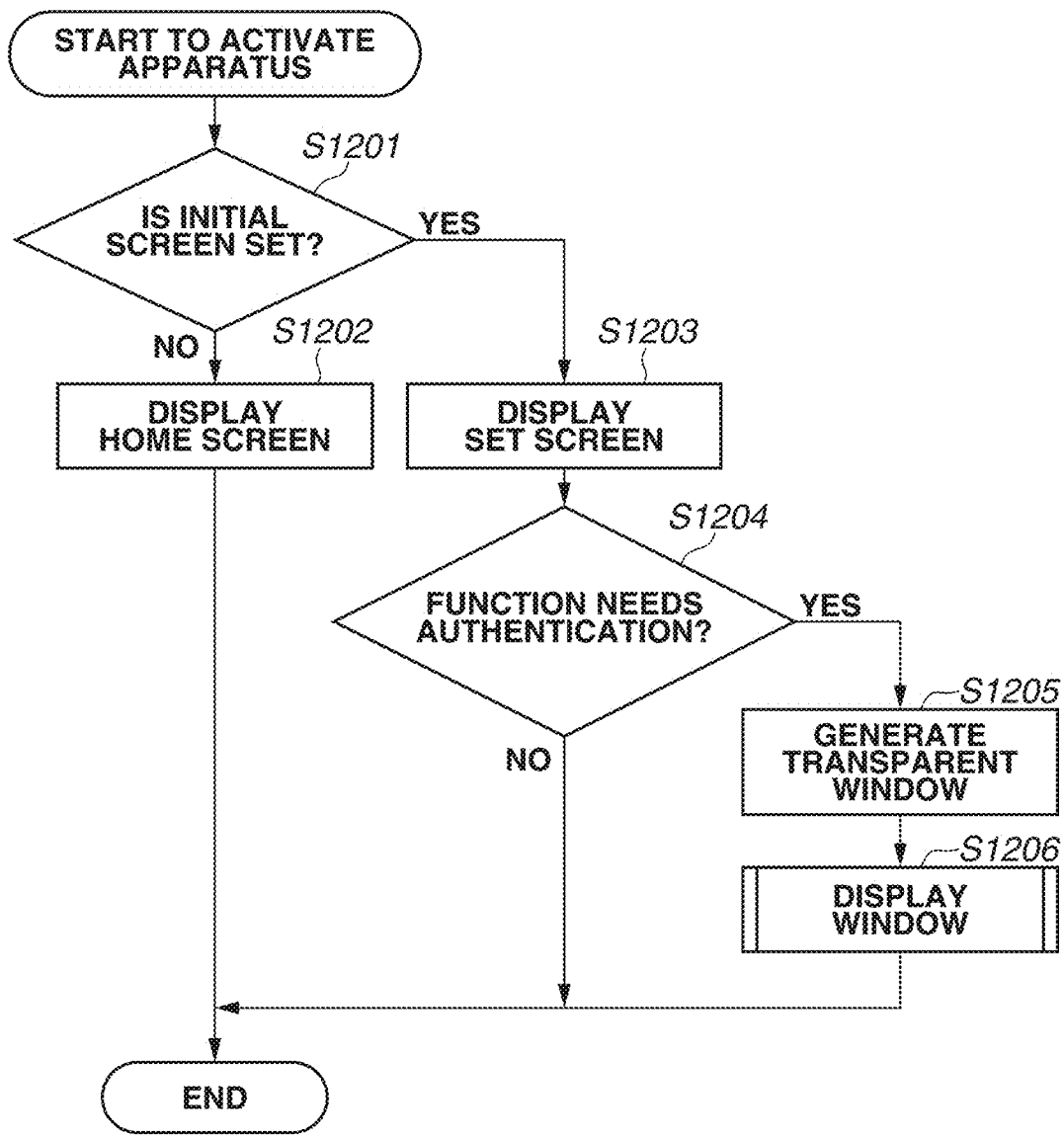

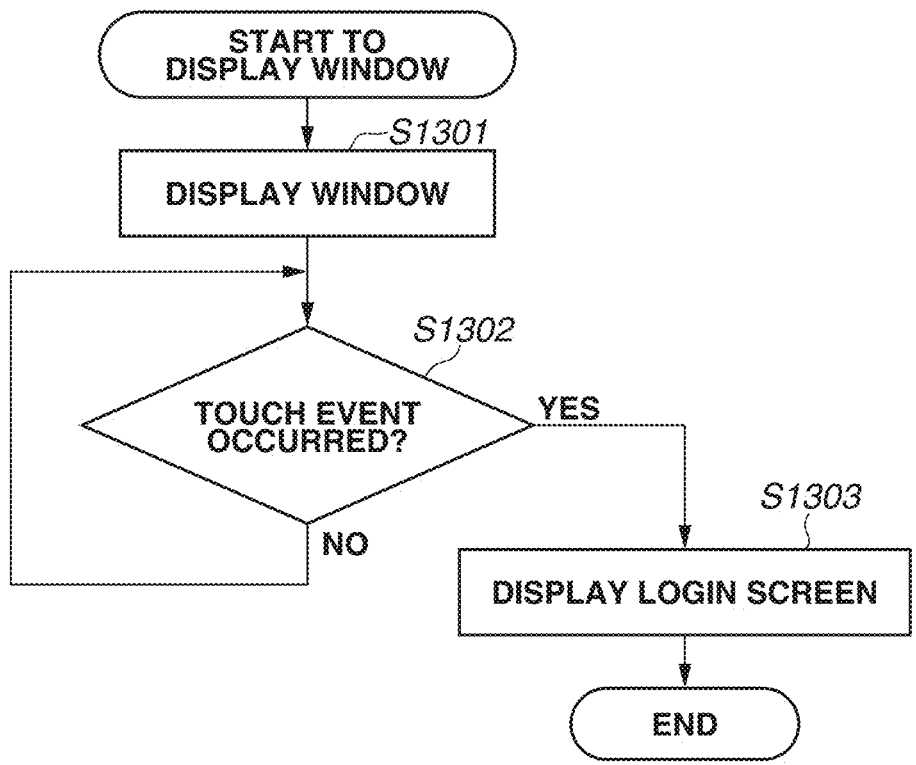

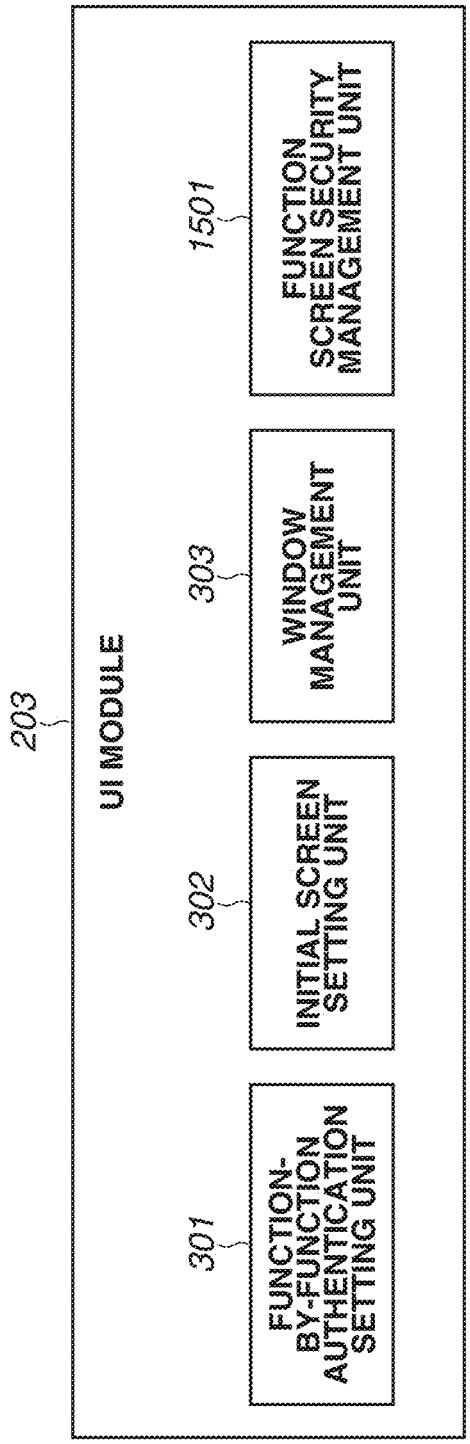

IMAGE PROCESSING APPARATUS DISPLAYS USER AUTHENTICATION SCREEN REQUIRING AUTHENTICATION, USER OPERATION ON IMAGE PROCESSING FUNCTIONS SCREEN IS NOT SELECTED, AND SCREEN DISPLAY METHOD

BACKGROUND

Field

The present disclosure relates to a screen display method corresponding to a setting status of an apparatus.

Description of the Related Art

Japanese Patent Application Laid-Open No. 2007-79684 discusses an image forming apparatus that has a plurality of functions and, in order to increase security, may make settings to request user authentication when a user uses a function. For example, when such settings are made for a copy function, a screen for inputting authentication information is displayed when the user uses the copy function, and when authentication is successful with the input authentication information, a screen of the copy function is displayed so that the user may use the function.

Some image forming apparatuses allow users to set the initial screen displayed immediately after activation of the image forming apparatus in order to enhance the convenience of the image forming apparatuses (see Japanese Patent Application Laid-Open No. 2015-220720). For example, when the screen of the copy function is set as the initial screen, the screen of the copy function may be displayed immediately after the image forming apparatus is activated.

According to Japanese Patent Application Laid-Open No. 2007-79684, when the user selects the function that needs authentication, the screen for inputting authentication information is displayed before the screen of the function is displayed. In addition to the fact that the screen of the function is not displayed even though the function is selected, the user may have difficulty in understanding what the input authentication information on the displayed screen is for. For example, when the copy function is set as a function that needs authentication while the screen of the copy function is set as the initial screen, the screen for inputting authentication information is displayed immediately after the apparatus is activated, and therefore the user is likely to have difficulty in properly understanding what the input authentication information is for. As described above, in a case where the screen of the function that needs authentication is displayed, when the screen for inputting authentication information is displayed first, the user may have difficulty in understanding what the authentication is for. However, in a case where the screen of the function that needs authentication is displayed, the security is not ensured if the screen of the function is displayed so as to allow user operations before authentication is conducted.

SUMMARY

Aspects of the present disclosure are directed to providing a screen display method by which, when a screen of a function that requires authentication is displayed, the security can be ensured while the user can understand what the authentication is for.

According to an aspect of the present disclosure, an image processing apparatus providing a plurality of functions includes a display control unit configured to, upon receiving an instruction for displaying a screen of a function where use of the function requires authentication, display the screen of the function requiring authentication in a state where a user operation on the screen of the function is not received, wherein the display control unit enables receipt of a user operation on the screen of the function in a case where a user is successfully authenticated and authorized to use the function.

Further features of the present disclosure will become apparent from the following description of exemplary embodiments with reference to the attached drawings.

BRIEF DESCRIPTION OF THE DRAWINGS

FIGS. 6A to 6C illustrate examples of a screen regarding function-by-function authentication displayed by the image processing apparatus.

FIG. 7 is a table illustrating an example of a table managed by a function screen security management unit according to a third exemplary embodiment.

FIG. 12 is a flowchart of processing to display a screen when the image processing apparatus is activated according to a first exemplary embodiment.

FIG. 13 is a flowchart of processing to display a window according to the first exemplary embodiment.

FIG. 15 is a block diagram illustrating a configuration of the UI module 203 according to the third exemplary embodiment.

DESCRIPTION OF THE EMBODIMENTS

Exemplary embodiments of the present disclosure will be described with reference to the drawings. The exemplary embodiments are not intended to limit the present disclosure defined in the claims, and not all the combinations of features described in the exemplary embodiments are essential to the solution of the present disclosure. In the description below, an image processing apparatus is used as an example of an information processing apparatus, but the exemplary embodiments are not limited to the image processing apparatus.

Figure 1:
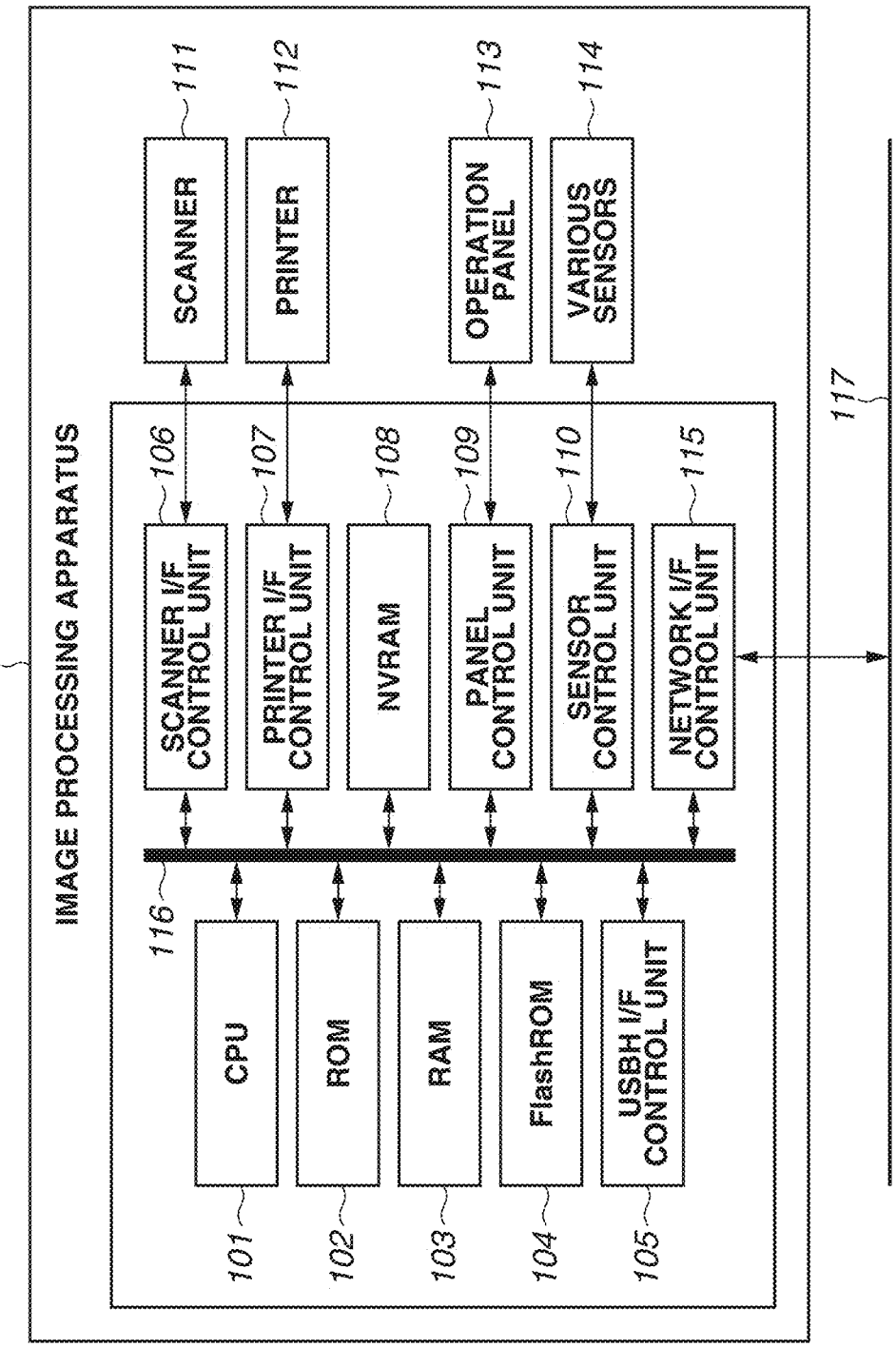
FIG. 1 is a block diagram illustrating an example of a hardware configuration of an image processing apparatus.

A configuration of hardware and a system according to a first exemplary embodiment will now be described. FIG. 1 is a block diagram illustrating a hardware configuration of an image processing apparatus 100 according to the first exemplary embodiment. A central processing unit (CPU) 101 executes a software program of the image processing apparatus 100 and controls the image processing apparatus 100.

A read only memory (ROM) 102 stores a boot program, fixed parameters, and the like, of the image processing apparatus 100. A random access memory (RAM) 103 is used to temporarily store data, and the like, when the CPU 101 controls the image processing apparatus 100. A flash ROM 104 is a rewritable non-volatile memory and is used to store various types of data, such as installed applications, application data, and print data. A Universal Serial Bus host (USBH) interface (I/F) control unit 105 controls a USB host I/F and controls communications with various USB devices (not illustrated) that connect to the image processing apparatus 100.

A scanner I/F control unit 106 is a device configured to control a scanner 111. A printer I/F control unit 107 is a device configured to control a printer 112. A non-volatile random-access memory (NVRAM) 108 is a non-volatile memory and stores various setting values of the image processing apparatus 100. A panel control unit 109 controls an operation panel 113 to display various types of information and receive instruction input from a user. The operation panel 113 includes a display configured to present contents, a touch panel display configured to receive user's touch operations, and the like. A sensor control unit 110 is a device configured to control various sensors 114 included in the image processing apparatus 100. Examples of the sensors 114 include a human detection sensor configured to determine whether there is a person in front of the image processing apparatus 100. A network I/F control unit 115 controls sending and reception of data to and from a network 117. A bus 116 is connected to the CPU 101, the ROM 102, the RAM 103, and the flash ROM 104. The bus 116 is also connected to the USBH I/F control unit 105, the scanner I/F control unit 106, the printer I/F control unit 107, the NVRAM 108, the panel control unit 109, the sensor control unit 110, and the network I/F control unit 115. The bus 116 is a system bus via which control signals from the CPU 101 and data signals between the devices are transmitted and received.

The CPU 101 can execute programs to function as various units. A control circuitry such as an application specific integrated circuit (ASIC), which operates in conjunction with the CPU 101, can also function as these units. These units can be implemented by the combination of the CPU 101 and the control circuitry configured to control the operation of the image processing apparatus 100. The CPU 101 does not need to be a single CPU, but may be a plurality of CPUs. In this case, the plurality of CPUs 101 may perform processing in a distributed manner. The plurality of CPUs can be arranged in a single computer or in a plurality of physically different computers. The unit to be implemented when the CPU 101 executes a program can be implemented by a dedicated circuitry.

Figure 2:
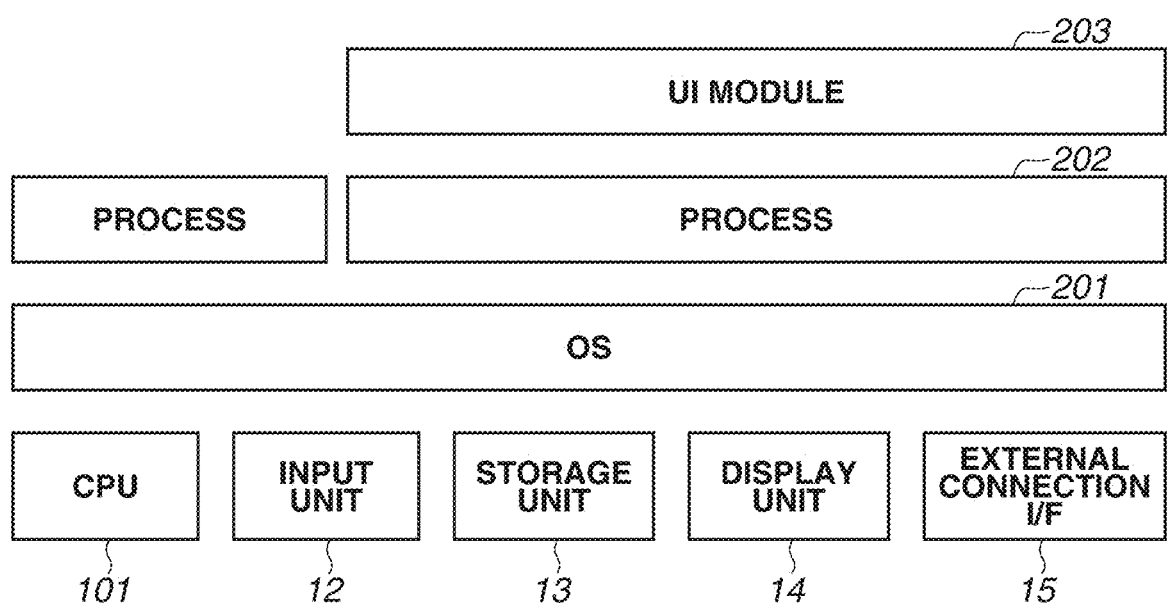
FIG. 2 is a block diagram illustrating an example of a system configuration of the image processing apparatus.

FIG. 2 illustrates an example of a system configuration of the image processing apparatus 100. An operating system (OS) 201 is software that controls the basic functions of the image processing apparatus 100. A process 202 is a unit of execution for operating software on the OS 201.

An input unit 12 corresponds to the scanner I/F control unit 106, the printer I/F control unit 107, the sensor control unit 110, and the like. A storage unit 13 corresponds to the ROM 102, the RAM 103, the flash ROM 104, the NVRAM 108, and the like. A display unit 14 corresponds to the panel control unit 109, and the like.

An external connection I/F 15 corresponds to the network I/F control unit 115, and the like. A user interface (UI) module 203, which is a program operating on the process 202, controls the display of screens displayed by the image processing apparatus 100 and controls receipt of user operations.

Figure 3:
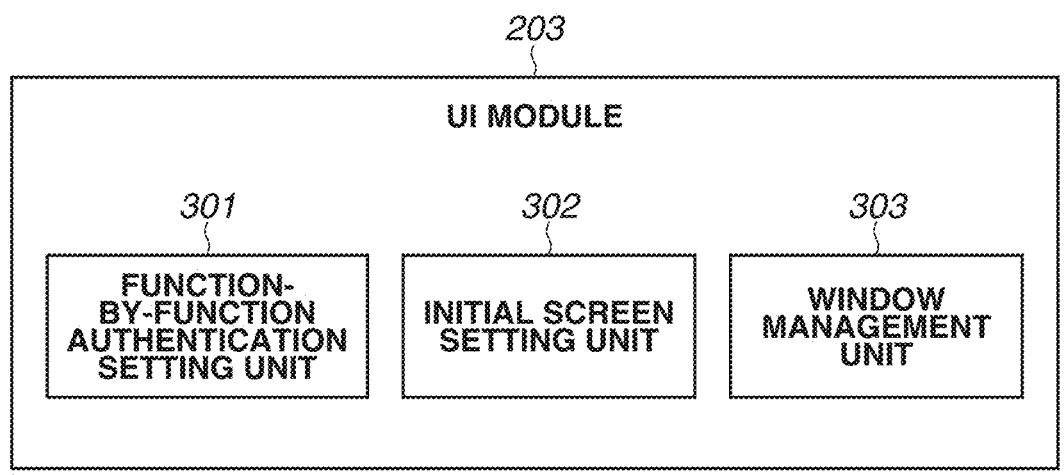
FIG. 3 is a block diagram illustrating a configuration of a user interface (UI) module 203 according to a first exemplary embodiment.

FIG. 3 is a block diagram illustrating a configuration of the UI module 203 according to the first exemplary embodiment. A function-by-function authentication setting unit 301 manages display settings, and the like, of a login screen for inputting authentication information.

Specifically, the function-by-function authentication setting unit 301 manages a function that requires authentication for use, information on a user who may use the function, and the like. An initial screen setting unit 302 stores settings such as the display timing of an initial screen. The initial screen setting unit 302 stores information on the initial screen set on an initial screen setting screen 500 described below. A window management unit 303 manages windows that are entities of the screens displayed by the image processing apparatus 100.

Figure 11:
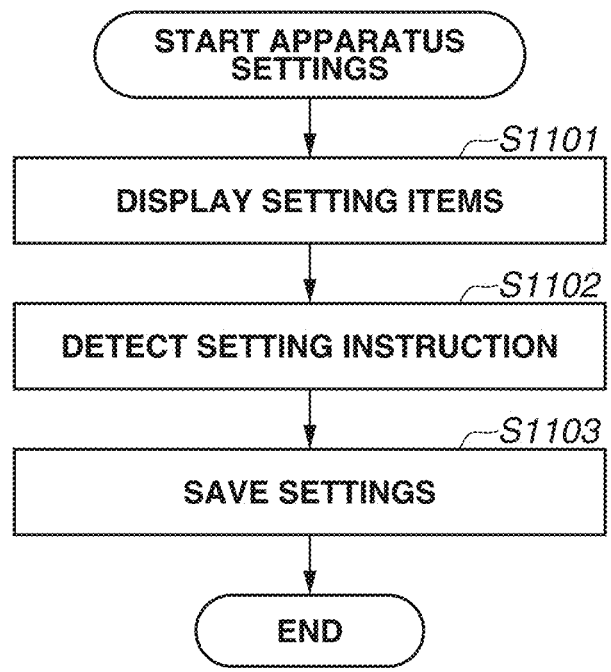
FIG. 11 is a flowchart of processing to receive a setting by the image processing apparatus.

The image processing apparatus 100 stores various settings instructed by the user. A series of processes of the processing to store the setting regarding the image processing apparatus 100 after the image processing apparatus 100 receives the setting from the user will be described with reference to the flowchart in FIG. 11. The processing in the flowchart of FIG. 11 is performed when the CPU 101 loads, into the RAM 103, or the like, the program for implementing each control module stored in the ROM 102, the NVRAM 108, or the like, and executes the program.

When an operation for the setting is received from the user, in step S1101, the UI module 203 displays a setting item. In step S1102, the user operation is received for the displayed setting item. In step S1103, when a predetermined operation is received, the setting received from the user is saved in the flash ROM 104, the NVRAM 108, etc.

Figure 4A:
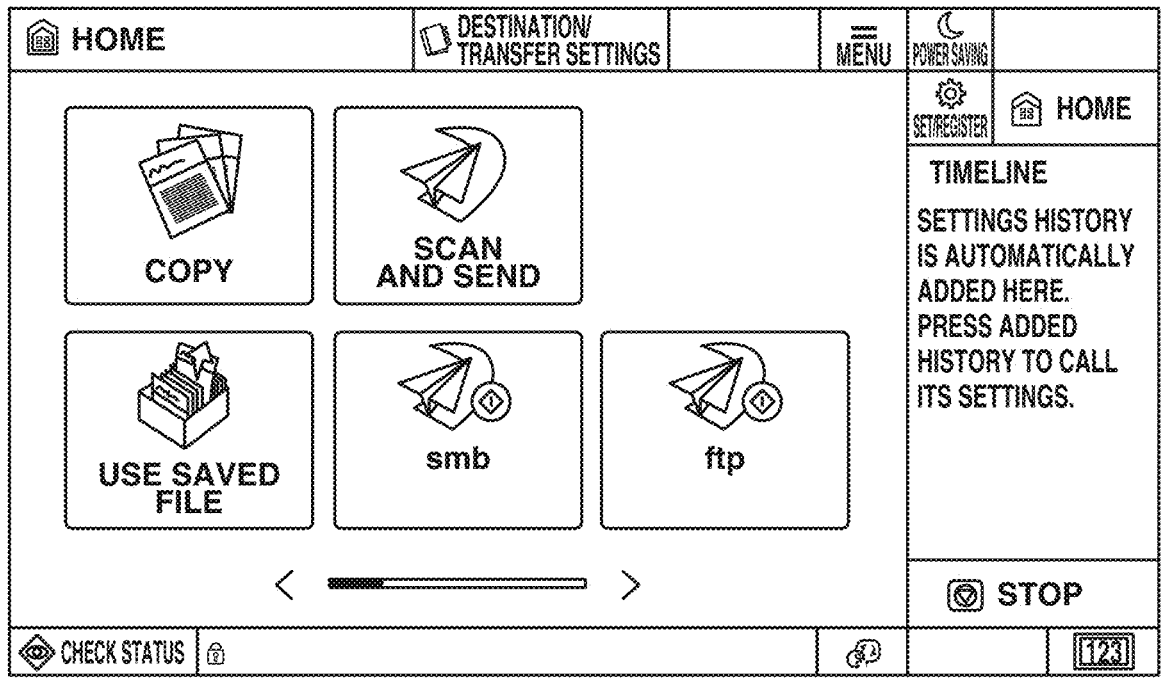
FIGS. 4A and 4B illustrate examples of a screen displayed by the image processing apparatus.
Figure 4B:
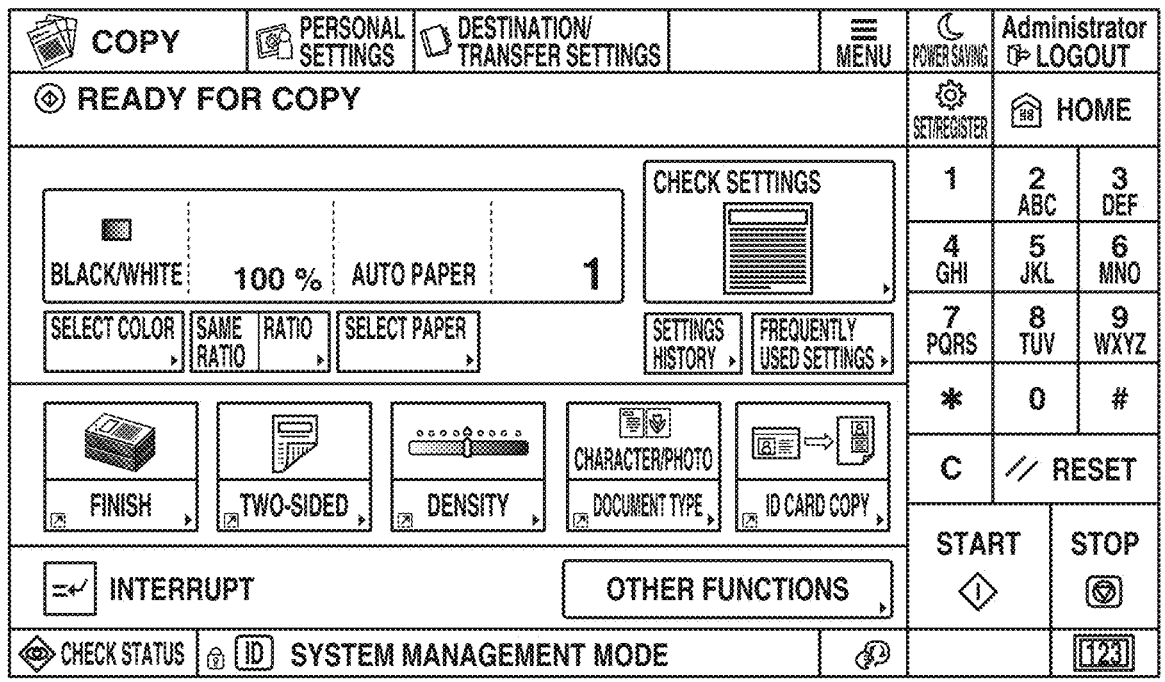

An example of an operation screen of the image processing apparatus 100 will be described with reference to FIGS. 4A and 4B. FIGS. 4A and 4B illustrate examples of the screen displayed by the image processing apparatus 100. FIG. 4A illustrates an example of the screen to be displayed immediately after the image processing apparatus 100 is activated, and the home screen is displayed in default settings. The home screen displays icons for executing functions, such as copy and scan, so that the user can select the icon of the desired function to display the screen of the function. FIG. 4B illustrates an example of the copy function screen displayed when the icon of the copy function is selected on the home screen. The copy function screen receives various settings and execution instructions for the copy function to execute the function.

Figure 5:
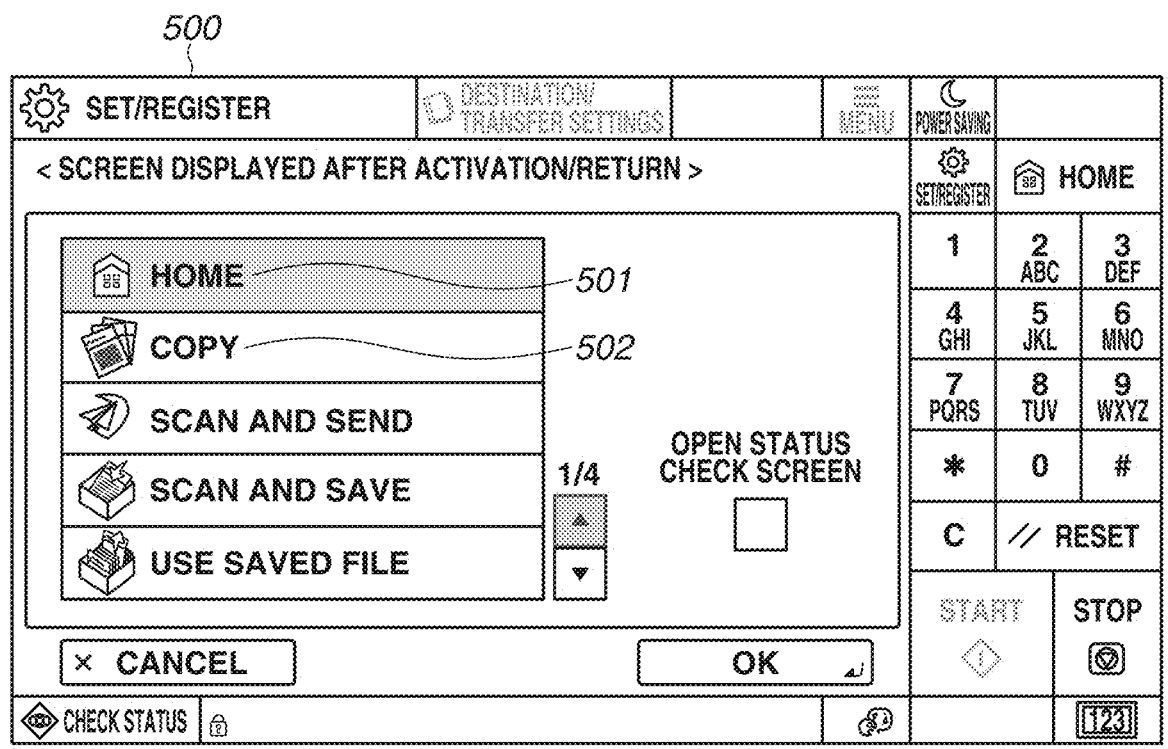
FIG. 5 illustrates an example of a screen for setting "screen displayed after activation/return".

FIG. 5 illustrates an example of the screen for setting "screen displayed after activation/return". The initial screen setting screen 500 is a screen for setting the screen (hereinafter referred to as "initial screen") to be displayed after activation/return by the image processing apparatus 100. For example, the screen is provided to the administrator of the image processing apparatus 100.

Home 501 is an item for setting the home screen illustrated in FIG. 4A as the initial screen. The home screen is set as the initial screen, and the background color of the home 501 has been changed. Copy 502 is a setting item for setting the copy function screen illustrated in FIG. 4B as the initial screen. In the example of FIG. 5, the copy function screen is not set as the initial screen and therefore is displayed in the white background color as with the other screens, and it can be understood that the copy function screen is not set. In addition, the screens of a scan and send function, a scan and save function, a print function, and the like, can be set as the initial screen. In some environments where the image processing apparatus 100 is used, only certain functions may be used. In such an environment, if the home screen is displayed each time the image processing apparatus 100 is activated, the user needs to select the icon of a certain function each time, which is not user-friendly. In such an environment, the usability is improved by properly setting the initial screen on the initial screen setting screen 500. The setting received on the initial screen setting screen 500 is saved in the image processing apparatus 100 during the processing in the flowchart of FIG. 11.

Figure 8:
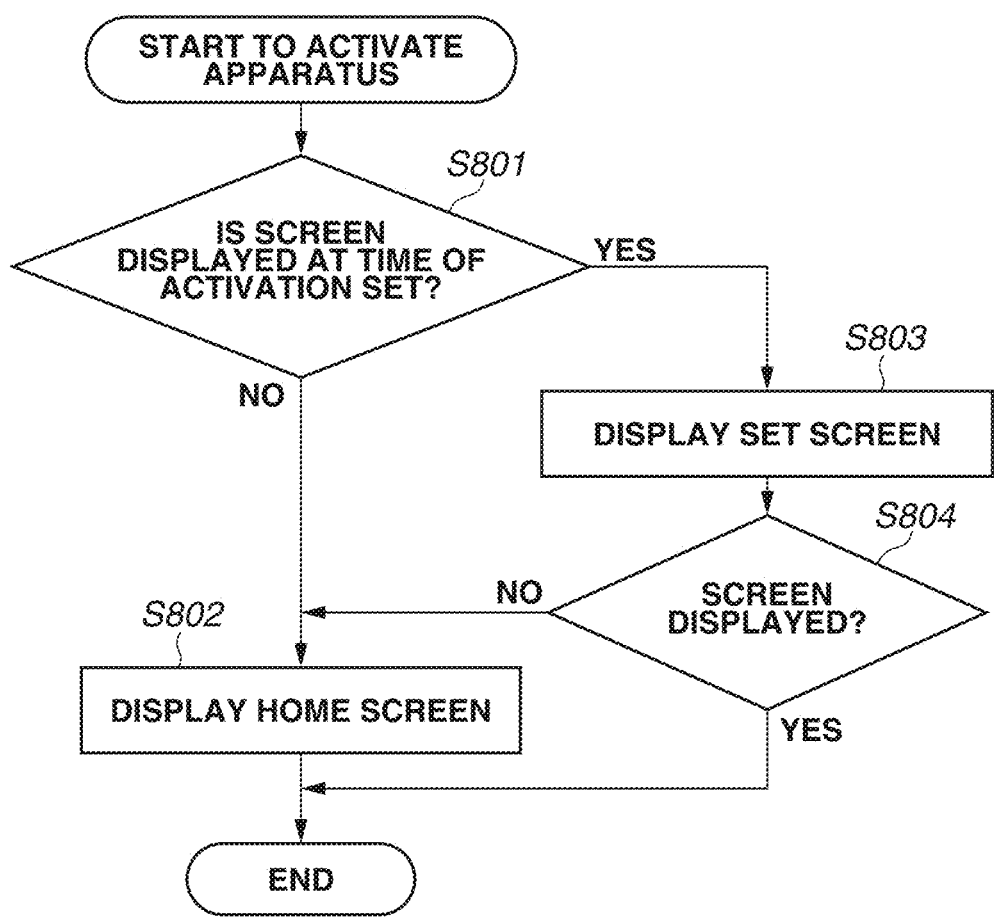
FIG. 8 is a flowchart of processing to display a screen when the image processing apparatus is activated.

A series of processes of the processing to display the initial screen based on the setting received on the initial screen setting screen 500 by the image processing apparatus 100 will be described with reference to FIG. 8. The processing in the flowchart of FIG. 8 is performed when the CPU 101 loads, into the RAM 103, or the like, the program for implementing each control module stored in the ROM 102, the NVRAM 108, or the like, and executes the program.

When the activation starts, in step S801, the image processing apparatus 100 determines whether the initial screen is set. Specifically, the image processing apparatus 100 determines whether the initial screen is set on the initial screen setting screen 500. In a case where the initial screen is not set (No in step S801), in step S802, the UI module 203 displays the home screen in default settings. In a case where the initial screen is set (YES in step S801), in step S803, the UI module 203 displays the set screen. In step S804, the UI module 203 determines whether the screen has been properly displayed. In a case where the screen has been properly displayed (YES in step S804), the processing ends. In a case where the screen has not been properly displayed (NO in step S804), for example, in a case where an error has occurred and the screen could not be displayed, the processing proceeds to step S802 to display the home screen.

It is possible to set, for each function, whether to request authentication when the user uses a function provided by the image processing apparatus 100. This is referred to as function-by-function authentication. For example, it is possible to make a setting to request authentication for the copy function and not to request authentication for the scan and send function. In a case where the icon of the copy function is selected on the home screen (FIG. 4A), the screen for inputting authentication information is displayed. In a case where the screen receives the input of the authentication information and the authenticated user is authorized to use the copy function, the screen (FIG. 4B) of the copy function is displayed so that the user can use the copy function. In a case where the icon of the scan and send function is selected on the home screen, the screen for inputting the authentication information is not displayed, and the scan and send function screen is displayed in a state where the user can use the scan and send function. Thus, it is possible to set whether to request authentication for each function provided by the image processing apparatus 100.

Figure 6B:
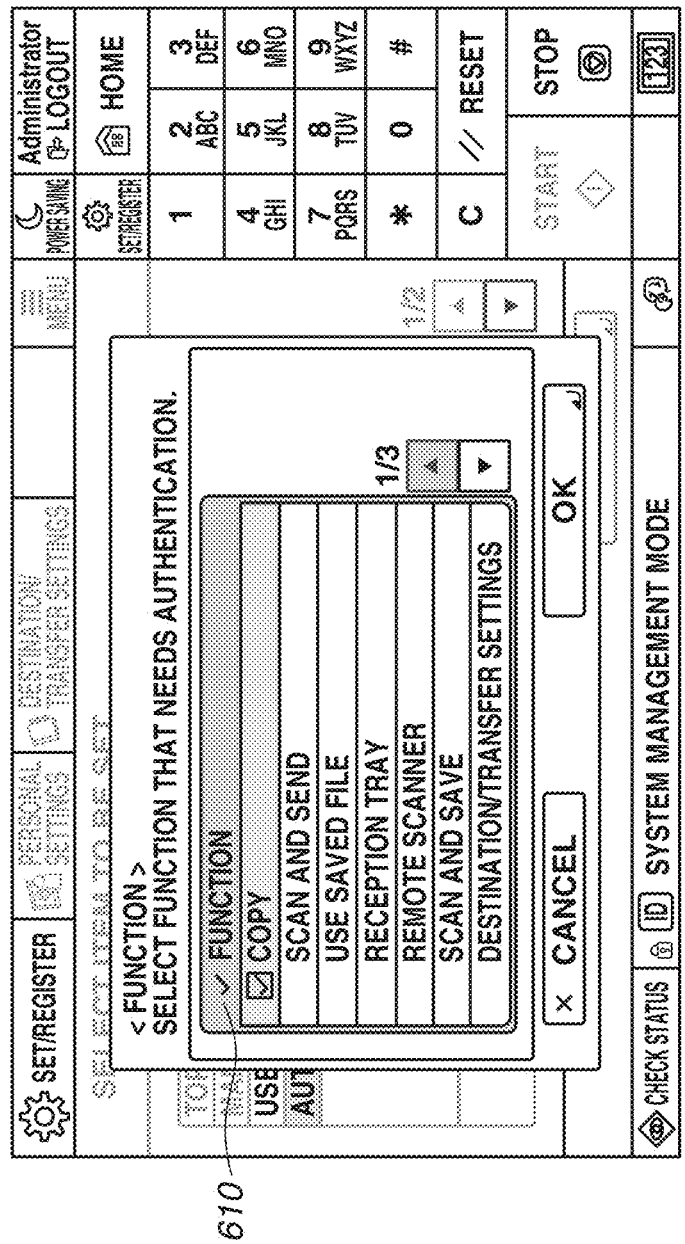

FIGS. 6A to 6C illustrate examples of the screen regarding function-by-function authentication. FIG. 6A illustrates a display setting screen for a login screen for inputting authentication information such as a user name and a password. The timing for displaying the login screen can be set to a predetermined timing. For example, "displayed when operation is started" 601 is an item for displaying the login screen when the user starts to use the image processing apparatus 100 (e.g., immediately after the image processing apparatus 100 is activated or when the image processing apparatus 100 returns from a power-saving mode). That is, with this setting enabled, the user is requested to input the authentication information before starting the operation when the user uses any function.

"Displayed when function is selected" 602 is an item for displaying the login screen in a case where the user selects a specific function. In a case where the "displayed when function is selected" 602 is enabled, a button 603 is displayed to select a function that requires authentication. When the button 603 is selected, a selection screen for the function that requires authentication in FIG. 6B is displayed.

The selection screen for the function in FIG. 6B is a screen for selecting the function for which the login screen is displayed, in a case where the user uses the function, for example, when the icon of the function is selected on the home screen. Copy Function 610 is an item for displaying the login screen when the user uses the copy function. A check mark is displayed in the copy function 610, and the copy function is selected as a function that requires authentication. The function that requires authentication is not limited to copy, but may be set to "scan and send" function, "scan and save" function, "print" function, and the like. The setting received on the screen is saved in the image processing apparatus 100 during the processing in the flowchart of FIG. 11.

FIG. 6C illustrates an example of an authentication information input screen that is displayed in a case where the user uses the function that requires authentication. A login screen 620 is a screen for inputting the authentication information required for authentication to use the function. An item 621 is a user name item, and although the user name has been input in this example, the user can input the user name in an input field. An input field 622 is for inputting a password and receiving an input via, for example, a software keyboard. A login button 623 is a button for performing authentication based on the password or the like input in the input field 622. In a case where the input authentication information is registered in the image processing apparatus 100 or an external server and the authentication is successful, the user can log into the image processing apparatus 100. In a case where the logged-in user is authorized to use the function, the screen of the function is displayed.

Figure 9:
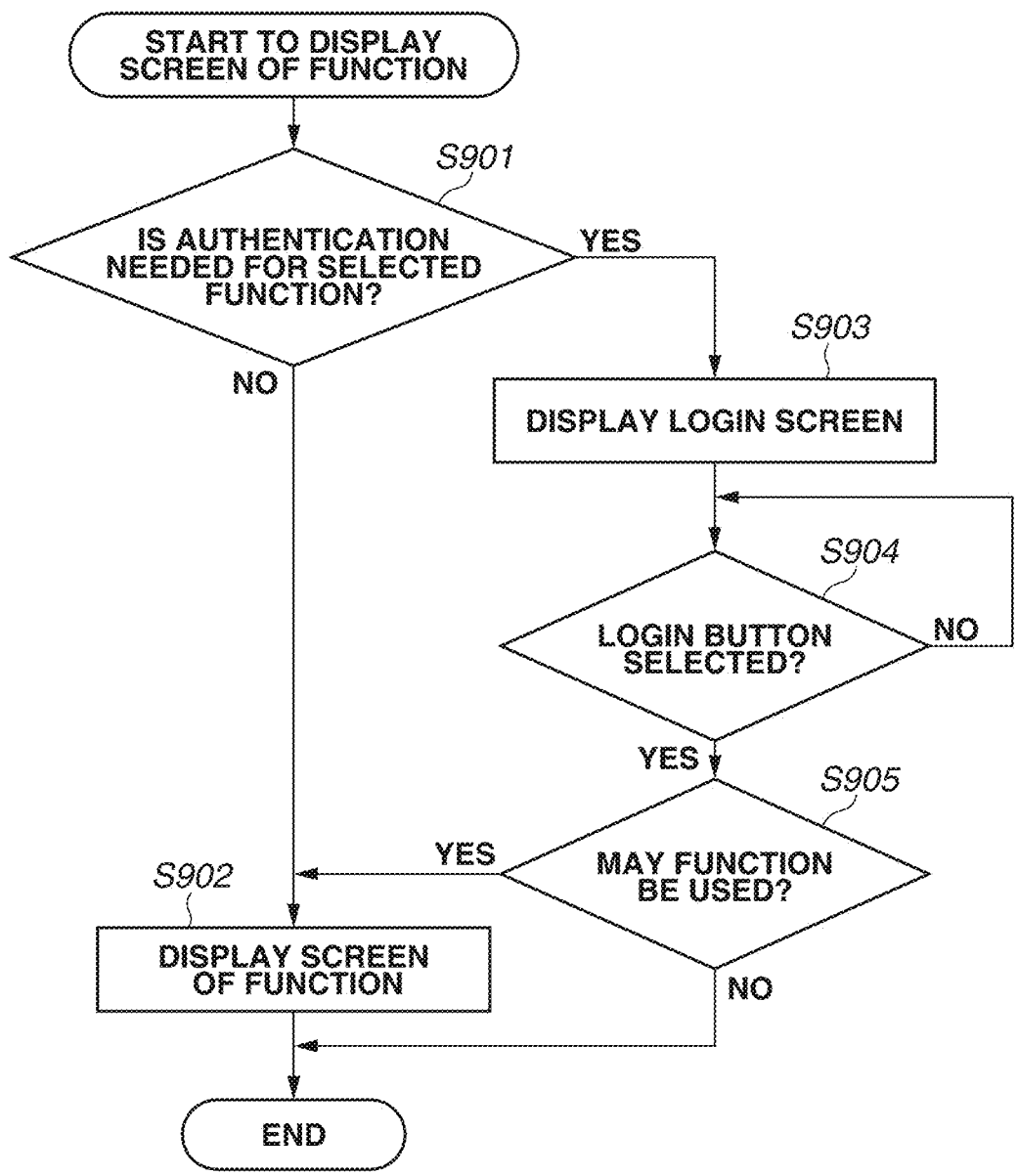
FIG. 9 is a flowchart of processing to display a screen of a function by the image processing apparatus.

A series of processes of the processing to display the screen of the function will be described with reference to FIG. 9. The processing in the flowchart of FIG. 9 is performed when the CPU 101 loads, into the RAM 103, or the like, the program for implementing each control module stored in the ROM 102, the NVRAM 108, or the like, and executes the program. An example of displaying an operation screen of the function in a case where the icon of the function is selected on the home screen, or the like, will be described.

In a case where the icon corresponding to the function is selected on the home screen, in step S901, the function-by-function authentication setting unit 301 determines whether authentication is required to use the selected function. In a case where the function-by-function authentication setting unit 301 determines that authentication is not required (No in step S901), in step S902, the UI module 203 displays the screen of the selected function. For example, the operation screen of the copy function illustrated in FIG. 4B is displayed. In a case where the function-by-function authentication setting unit 301 determines that authentication is required (YES in step S901), in step S903, the login screen is displayed. For example, the login screen 620 is displayed.

In step S904, the UI module 203 determines whether the login button 623 has been selected on the login screen 620. In a case where the UI module 203 determines that the login button 623 has not been selected (No in step S904), the processing remains in step S904. In a case where UI module 203 determines that the login button 623 has been selected (YES in step S904), authentication is performed with the input authentication information. In step S905, the function-by-function authentication setting unit 301 determines whether the authenticated user can use the copy function. In a case where the function-by-function authentication setting unit 301 determines that the function can be used (YES in step S905), the processing proceeds to step S902 to display the screen of the function. In a case where the authentication has failed or the function-by-function authentication setting unit 301 determines that the function cannot be used (NO in step S905), the user is notified of an error and the processing ends.

Two existing functions, which are initial screen setting and function-by-function authentication, provided by the image processing apparatuses have been described above. In a case where the user selects the icon corresponding to the function that requires authentication on the home screen, the login screen is displayed instead of the screen of the function, which can confuse the user. In another example, the copy function screen is set as the initial screen and the copy function is set as a function that requires authentication. In this example, when the image processing apparatus is activated, it is determined in step S804 that the copy function screen is not displayable, and the home screen is displayed. Alternatively, the login screen for using the copy function is displayed when the image processing apparatus is activated. In both cases, the copy function screen is not displayed after the image processing apparatus is activated. In the former case, the displayed screen is different from the screen intended by the user. In the latter case, the user can have difficulty in understanding what the requested authentication is for.

In contrast to the conventional functions described above, according to an exemplary embodiment of the present disclosure, in a case where the copy function is set as a function that requires authentication and the copy function screen is set as the initial screen, the copy function screen is displayed after the image processing apparatus is activated with a transparent overlay window generated over the copy function screen. When a user operation is received on the transparent overlay window, the login screen is displayed and the user is requested to input the authentication information. Authentication is required for operations on the copy function screen, but is not required for displaying the copy function screen itself. Thus, it is possible to display the copy screen as the initial screen while also requesting authentication for the user operation.

A series of processes of activation processing of the image processing apparatus 100 according to a first exemplary embodiment of the present disclosure will be described with reference to FIG. 12. The processing in the flowchart of FIG. 12 is performed when the CPU 101 loads, into the RAM 103, or the like, the program for implementing each control module stored in the ROM 102, the NVRAM 108, or the like, and executes the program. In an example of the present embodiment, the copy function is set as a function that requires authentication and the copy function screen is set as the initial screen, but setting the function as the copy function is not seen to be limiting.

When activation of the image processing apparatus 100 starts, in step S1201, the image processing apparatus 100 determines whether the initial screen is set as in step S801. In a case where the image processing apparatus 100 determines that the initial screen is not set (No in step S1201), in step S1202, the home screen is displayed as in step S802. In a case where the image processing apparatus 100 determines that the initial screen is set (YES in step S1201), in step S1203, the display processing for displaying the set screen is performed. In step S1204, the function-by-function authentication setting unit 301 determines whether the function corresponding to the displayed set screen is a function that requires authentication. In a case where the function-by-function authentication setting unit 301 determines that the function does not need authentication (NO in step S1204), the processing ends. In a case where the function-by-function authentication setting unit 301 determines that the function requires authentication (YES in step S1204), in step S1205, the window management unit 303 generates a transparent overlay window. In step S1206, the generated transparent overlay window is positioned over the displayed set screen.

Figure 14A:
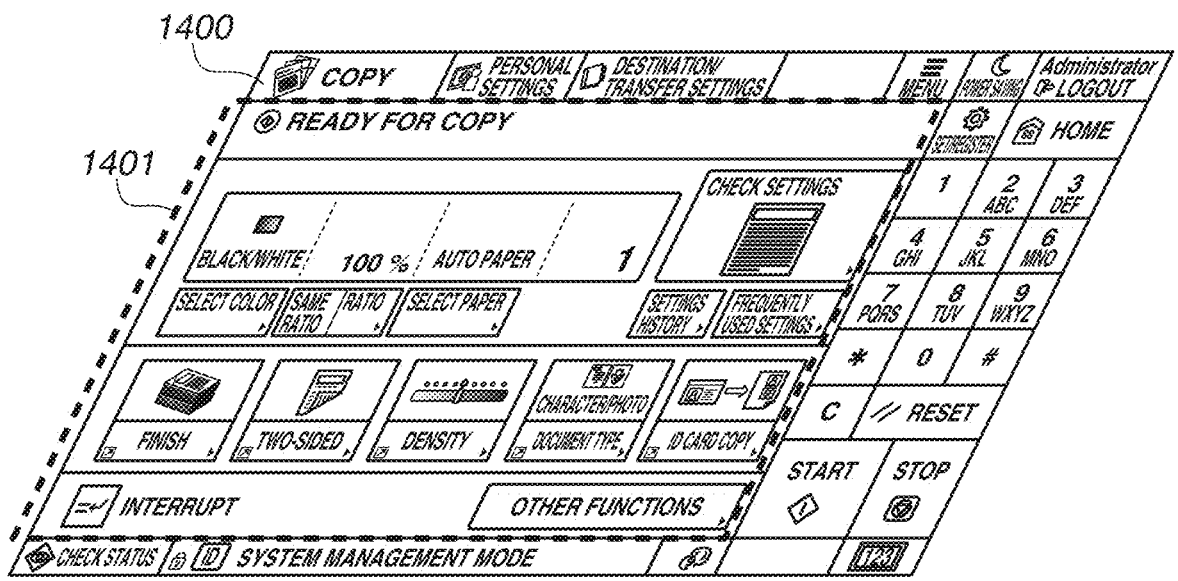
FIGS. 14A and 14B illustrate examples of screens of the image processing apparatus according to the first exemplary embodiment and the second exemplary embodiment.

FIG. 14A illustrates an example of the generated set screen. More specifically, FIG. 14A illustrates a copy function screen 1400 displayed in step S1203 and a transparent overlay window 1401 generated in step S1205. In the present exemplary embodiment, the transparent overlay window 1401 is the same size as a window of the screen of the specific function being displayed, e.g., copy function in FIG. 14A, on the image processing apparatus 100. When a user attempts to operate a function in a window of the copy function screen 1400, the presence of the transparent overlay window 1401 results in a touch event of the user being processed just as a touch event and prevents selection of any function provided by the window of the copy function screen 1400. In another exemplary embodiment, the size of the transparent overlay window 1401 is the same as the entire copy function screen 1400.

The details of the processing in step S1206 will be described with reference to FIG. 13. First, in step S1301, the window management unit 303 displays the generated transparent overlay window 1401. In step S1302, the window management unit 303 determines whether a touch event has occurred on the transparent overlay window 1401. In a case where the window management unit 303 determines that no touch event has occurred (NO in step S1302), the processing remains in step S1302. In a case where the window management unit 303 determines that a touch event has occurred (YES in step S1302), in step S1303, a login screen is displayed. The displayed login screen can be, for example, the login screen illustrated in FIG. 6C. The login screen can be displayed over the displayed screen of the function. In a case where authentication is successful based on the authentication information received via the login screen and the authenticated user is authorized to use the function, the screen of the function where the transparent overlay window is positioned becomes operable. Otherwise, the screen of the function where the transparent overlay window is positioned remains inoperable. That is, the state where a user operation on the screen of the function is not received is maintained until authentication becomes successful and it is determined that the authenticated user is authorized to use the function. In other words the user is not allowed to operate the screen of the function until the authentication becomes successful. The display of the login screen in step S1303 can be triggered by a user input of a hardware key or input from the various sensors 114 of the image processing apparatus 100 in addition to the occurrence of a touch event.

The above process enables, even in a case where the screen of the function that requires authentication is set as the initial screen, the screen of the function can be displayed when the image processing apparatus 100 is activated, and in a case where the window management unit 303 determines that the input of the authentication information can be requested in a case where the user operates the screen of the function. Accordingly, the specified screen can be properly displayed to the user after the image processing apparatus 100 is activated, and the user can understand what the required authentication is for. According to the present exemplary embodiment, a transparent overlay window is placed over a main window of the screen of the function so that the screen of the function is not operable, but the exemplary embodiments are not limited to the above case as long as the screen of the function is displayed and the user operation on the screen is not receivable. For example, the screen of the function can be displayed, and when a first user operation on the screen of the function is received, the login screen can be displayed such that the user operation is not interpreted as an operation on the screen of the function.

In above-described example according to the present exemplary embodiment, the screen of the function is displayed after the image processing apparatus 100 is activated. However, the screen of the function may not always be displayed in a case where the image processing apparatus 100 is activated. For example, when the icon of the function that requires authentication is selected on the home screen, too, the screen of the function can be displayed in the same manner, and user operations on the screen of the function may not be received. In a case where the icon of the function that requires authentication is selected on the home screen, the login screen can be displayed in a conventional manner as illustrated in FIG. 6C, and in a case where the screen of the function is displayed after the image processing apparatus 100 is activated, the screen of the function can be displayed in the state where user operations are not received.

A second exemplary embodiment will now be described. According to the first exemplary embodiment, while a screen of a function is displayed, a transparent overlay window for receiving a touch event is generated to prevent the user from operating the screen of the function. In a case where a user's touch operation on the transparent overlay window is detected, the login screen is displayed. The second exemplary embodiment as described below provides a user-friendly enhancement to a touch operation being required to display the login screen. In the example according to the present exemplary embodiment, the login screen is displayed over the screen of the function. The basic configuration according to the present exemplary embodiment is the same as that in the first exemplary embodiment, and therefore only differences from the first exemplary embodiment will be described.

Figure 14B:
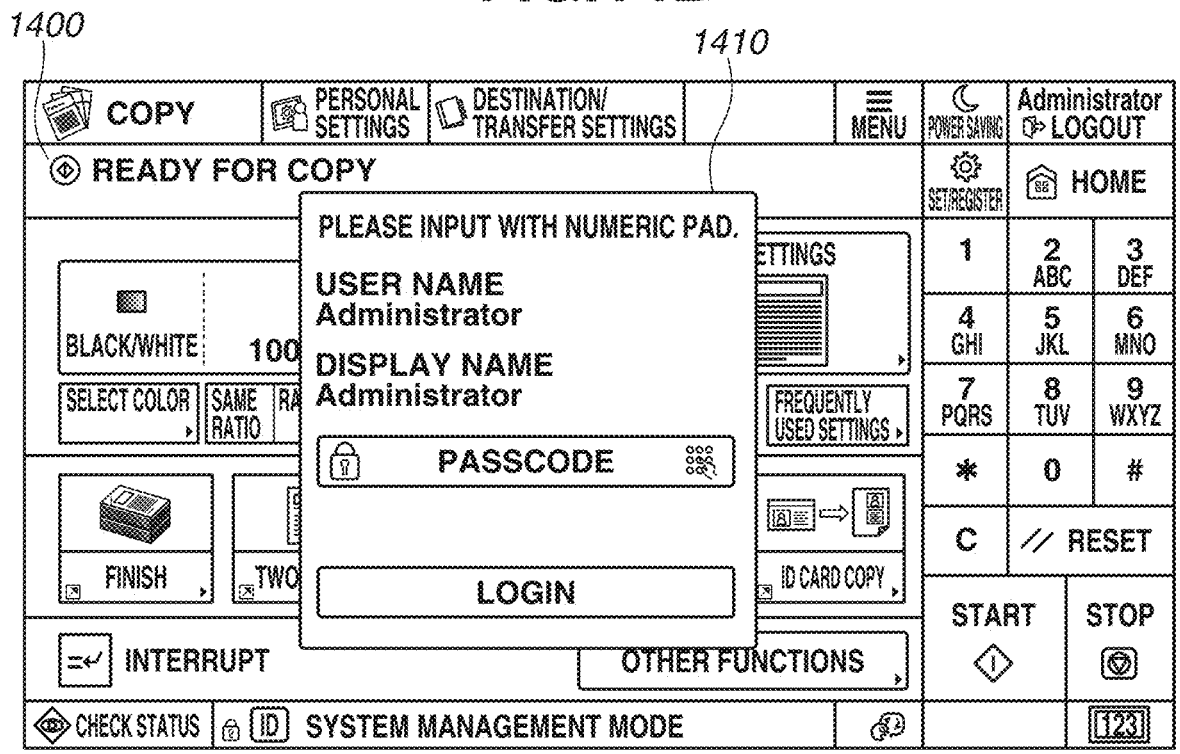

FIG. 14B illustrates a display example of the screen in a case where the screen of the function that requires authentication is displayed according to the present exemplary embodiment. It is assumed, as an example, that the copy function is set as a function that requires authentication.

FIG. 14B illustrates the screen 1400 of the copy function and a login screen 1410 superimposed over the copy function screen. While user operations on the login screen 1410 are receivable, operations on the screen 1400 of the copy function are not receivable. Thus, in the present exemplary embodiment, when a screen of the function is displayed, a login screen is displayed over the screen of the function, which does not require displaying the login screen and enables the user to easily understand what the authentication is for.

Figure 10:
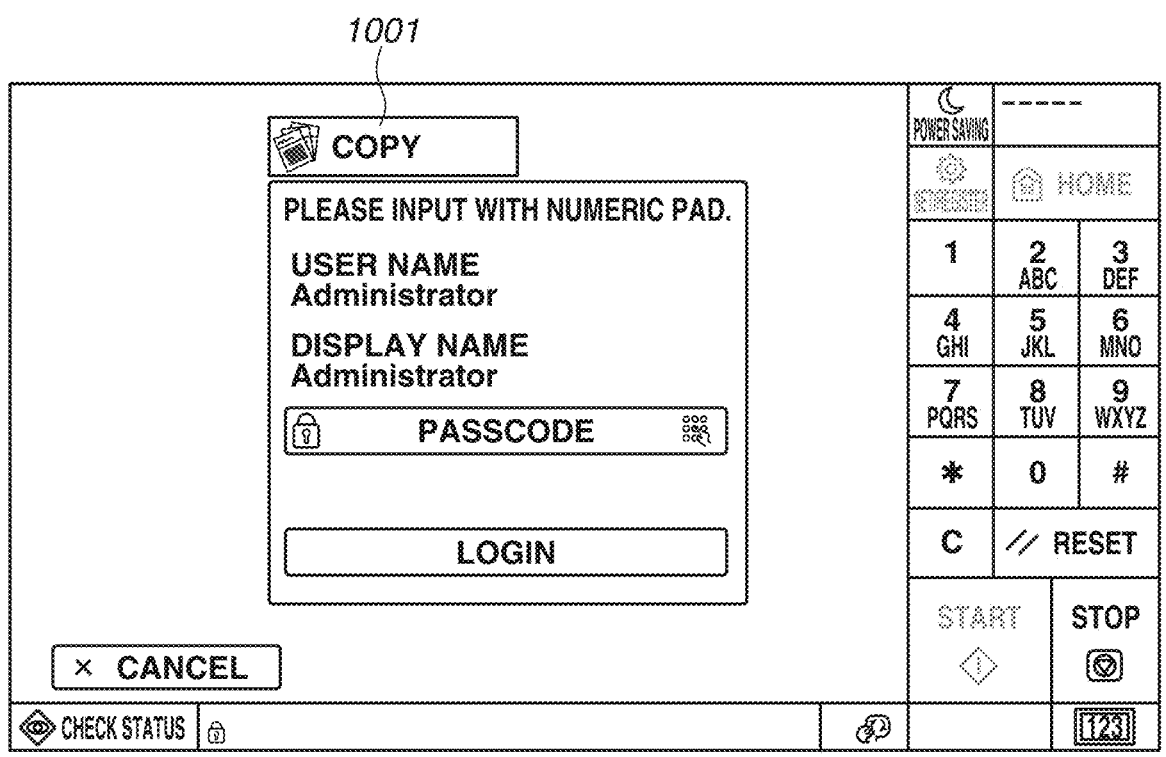
FIG. 10 illustrates a display example of a login screen according to a second exemplary embodiment.

In this example, the login screen is displayed over the screen of the function, but this is not seen to be limiting, and any configuration that enables a user to recognize what the login screen is for is applicable. For example, as illustrated in FIG. 10, the login screen is displayed but not the screen of the function and, as illustrated in a function display 1001, a display (e.g., the display of a character string or icon) can be provided to enable the user to recognize which function the login screen is for. According to the present exemplary embodiment, the above-described display method can also be applied to a case where the icon of the function that requires authentication is selected on the home screen.

A third exemplary embodiment will be now be described. In the first exemplary embodiment, a transparent overlay window is generated over a screen of a function so that the user can view the contents of the screen of the function but cannot operate the contents of the screen of the function. However, there may be a case where confidential information such as telephone numbers of clients is displayed on the fax function screen and an unauthorized user can view the screen. In the present exemplary embodiment, an example is described where either displaying the screen of the function so that the user can view the screen of the function or not displaying the screen of the function is selected depending on the function. The basic configuration according to the present exemplary embodiment is the same as that according to the first exemplary embodiment, and therefore only differences from the first exemplary embodiment will be described.

FIG. 15 illustrates a configuration of the UI module 203 according to the third exemplary embodiment. A function screen security management unit 1501 manages, for the screen of each function, the information whether there is a security issue in display. FIG. 7 illustrates an example of a management table stored by the function screen security management unit 1501. In a case where the copy function and the scan function are selected, only the buttons for operations are displayed, and thus it is defined that there is no security issue in the display. In a case where the fax function is selected, confidential information such as destinations and sending sources is displayed, and thus it is defined that there is a security issue in the display. The contents of the management table can be set, for example, by a system administrator.

Figure 16:
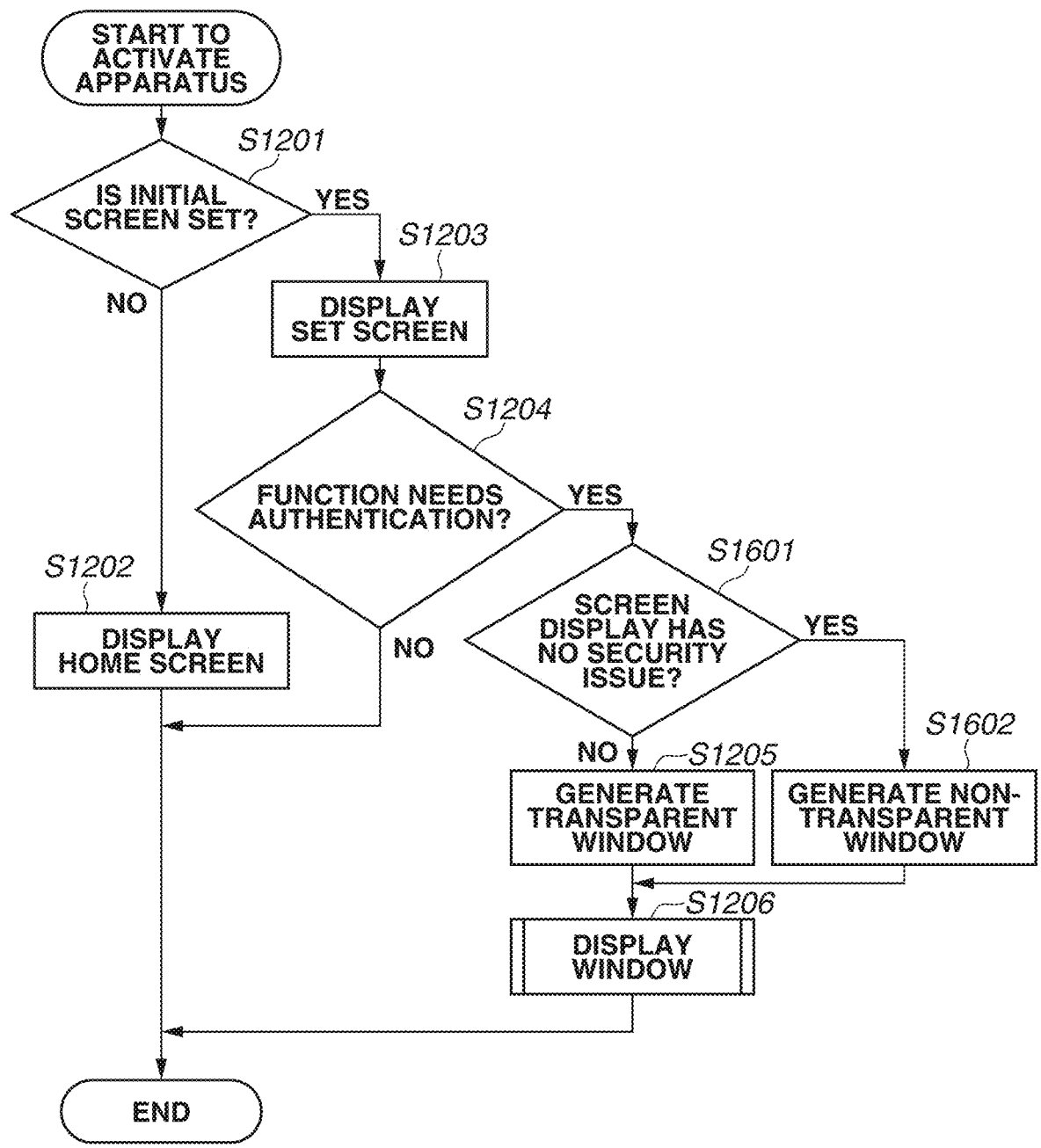
FIG. 16 is a flowchart of processing to display a screen when the image processing apparatus is activated according to the third exemplary embodiment.

A series of processes of activation processing of the image processing apparatus 100 according to the third exemplary embodiment will be described with reference to FIG. 16. The processing in the flowchart of FIG. 16 is performed when the CPU 101 loads, into the RAM 103, or the like, the program for implementing each control module stored in the ROM 102, the NVRAM 108, or the like, and executes the program. The basic configuration in this flowchart is the same as that in FIG. 12, and therefore only the differences will be described.

In a case where it is determined that the function requires authentication (YES in step S1204), in step S1601, the function screen security management unit 1501 determines whether the screen display of the function has no security issue. Specifically, the function screen security management unit 1501 makes the determination based on the management table illustrated in FIG. 7. In a case where the function screen security management unit 1501 determines that there is no security issue (No in step S1601), in step S1205, the transparent overlay window is generated, and in step S1206, the transparent overlay window is displayed.

Figure 17A:
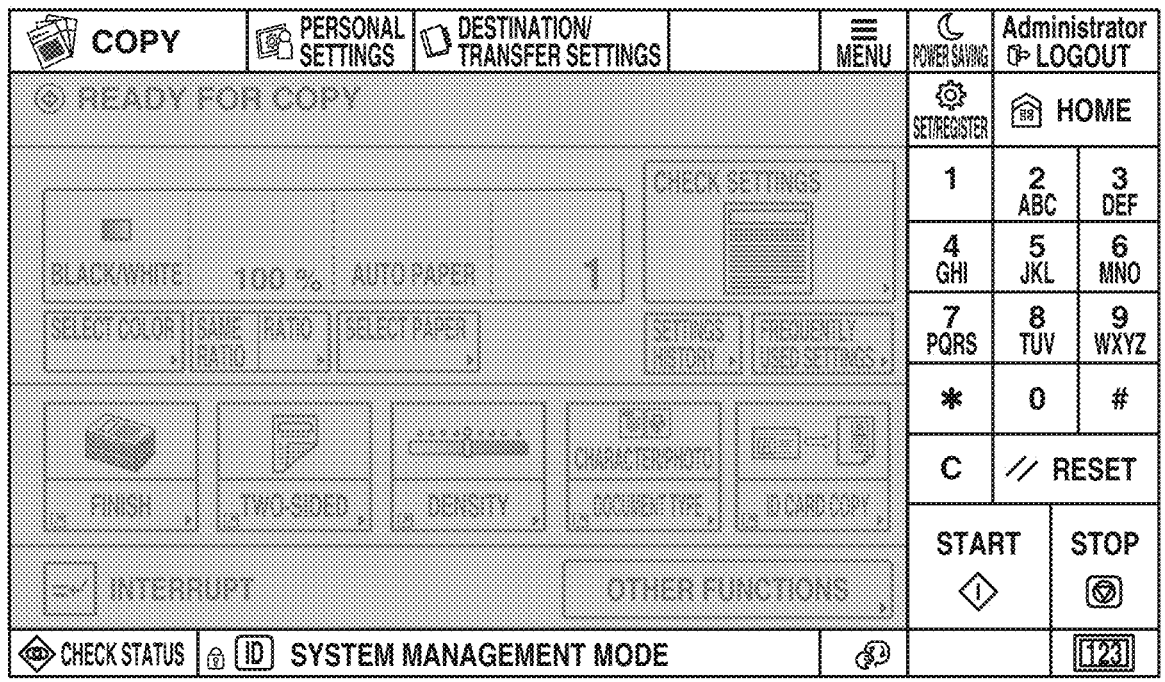
FIGS. 17A and 17B illustrate examples of screens displayed by the image processing apparatus according to the third exemplary embodiment.
Figure 17B:
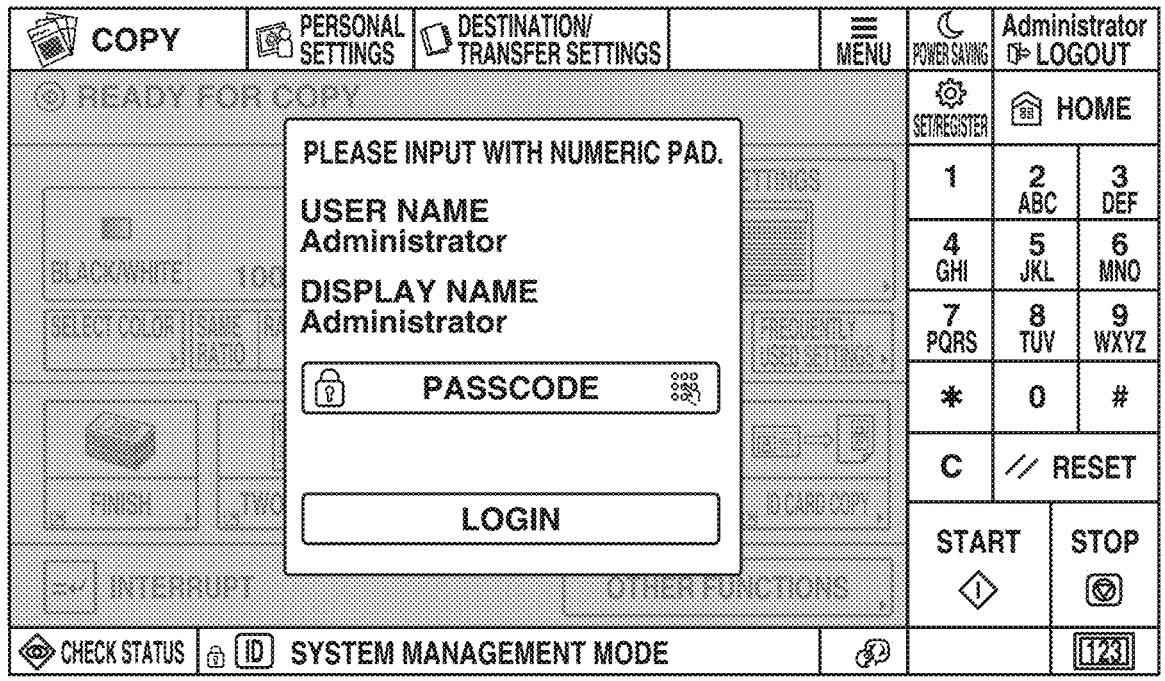

In a case where the function screen security management unit 1501 determines that there is a security issue (YES in step S1601), in step S1602, a non-transparent overlay window is generated. In step S1206, the non-transparent overlay window is positioned on the function screen. FIGS. 17A and 17B illustrate display examples using the generated non-transparent overlay window. The function screen in FIGS. 17A and 17B is visible for illustrative purposes, but implementation of the present embodiment results in the function screen not being visible. FIG. 17A illustrates an example of displaying the copy function screen illustrated in FIG. 4B with the non-transparent overlay window superimposed manner over a main window, which prevents the user from viewing the contents of the main window. The configuration of positioning the non-transparent overlay window over the screen of the function is not seen to be limiting. Any configuration that prevents a user from viewing the contents of a window of the screen of the function is applicable. For example, in another exemplary embodiment, a window of the screen of the function is not displayed at all. In another exemplary embodiment, the non-transparent overlay window can be positioned over the entire screen of the function.

In a case where the login screen is displayed over the screen of the function as illustrated in FIG. 14B according to the second exemplary embodiment, the visible login screen is displayed over the non-viewable portion of the screen of the function as illustrated in FIG. 17B.

The above-described processing prevents non-authenticated users from viewing the screen of the function when a predetermined condition is satisfied, such as existence of a security issue when non-authenticated users view the screen. According to the present exemplary embodiment, the above-described display method can also be applied to a case where the icon of the function that requires authentication is selected on the home screen.

The above-described exemplary embodiments can be implemented as systems, apparatuses, methods, programs, or recording media (storage media). Specifically, the exemplary embodiments are applicable to a system including a plurality of devices (e.g., host computers, I/F devices, imaging devices, or web applications) or to an apparatus including a single device.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-192727, filed Nov. 29, 2021, which is hereby incorporated by reference herein in its entirety.

What is claimed is:

1. An image processing apparatus having a plurality of functions including a predetermined function, the image processing apparatus comprising:

a display unit including a touch panel configured to receive a user operation;

a receiving unit configured to receive a display instruction for displaying a screen related to the predetermined function; and a display control unit configured to display the screen related to the predetermined function, wherein, in a case where the receiving unit receives the display instruction for displaying a first setting screen on which a setting value related to the predetermined function is displayed, the display control unit displays a transparent window having a same size as the first setting screen and capable of receiving a touch operation in a superimposed manner on the first setting screen at a surface over the first setting screen on the display unit, based on authentication processing for enabling a user operation for the setting value related to the predetermined function being required, and in a case where a user operation on the transparent window superimposed at the surface over the first setting screen is received, the display control unit displays an authentication screen capable of receiving the authentication processing on the display unit, and, when the authentication processing that is based on authentication information inputted on the authentication processing is successful and an authority of user information that is based on the authentication information with which the authentication processing is successful is an authority that allows the predetermined function to be used, the first setting screen is displayed at the surface of the display unit without superimposing the transparent window thereon, based on the authentication processing being not required in the case where the receiving unit receives the display instruction for displaying the first setting screen on which the setting value related to the predetermined function is displayed, the display control unit does not display the transparent window, when the authority of the user information that is based on the authentication information with which the authentication processing is successful is not an authority that allows the predetermined function to be used, the display control unit keeps the transparent window displayed in a superimposed manner on the first setting screen at the surface over the first setting screen on the display unit, a user operation for the setting value related to the predetermined function is disable on the first setting screen in a case where the transparent window is superimposed on the first setting screen and where the first setting screen is not displayed at the surface on the display unit, and a user operation for the setting value related to the predetermined function is enabled on the first setting screen in a case where the transparent window is not superimposed on the first setting screen and where the first setting screen is displayed at the surface on the display unit.

2. The image processing apparatus according to claim 1, wherein the display control unit hides the first setting screen and displays the authentication screen in a case where an operation on the predetermined screen is received.

3. The image processing apparatus according to claim 1, wherein the authentication screen is displayed in a superimposed manner on the first setting screen in a case where an operation on the transparent window superimposed at the surface over the first setting screen is received.

4. The image processing apparatus according to claim 1, wherein, in a case where the first setting screen is set as a screen to be displayed when the image processing apparatus is activated and where the receiving unit receives an activation operation to activate the image processing apparatus, the activation operation being the display instruction for displaying the first setting screen, the display control unit displays the transparent window in a superimposed manner on the first setting screen at the surface over the first setting screen on the display unit, based on the predetermined function being a function requiring the authentication processing.

5. The image processing apparatus according to claim 1, wherein the display control unit displays the first setting screen in a case where the receiving unit receives selection of the predetermined function on a home screen on which one of a plurality of functions is selectable.

6. The image processing apparatus according to claim 1, wherein, in a case where the display instruction is received, the display control unit displays the transparent window in a superimposed manner on the first setting screen at the surface over the first setting screen on the display unit, based on the predetermined function being a function requiring the authentication processing and the predetermined function satisfying a predetermined condition.

7. The image processing apparatus according to claim 6, wherein the predetermined condition is that information included in the screen related to the predetermined function has no security issue.

8. The image processing apparatus according to claim 6, wherein the display control unit displays the transparent window in a superimposed manner on the first setting screen on which the setting value related to the predetermined function is not visually recognizable at the surface over the first setting screen on the display unit, based on the predetermined function being the function requiring the authentication processing and the predetermined function not satisfying the predetermined condition.

9. The image processing apparatus according to claim 1, wherein the predetermined function being the function requiring the authentication processing is at least one of a copy function, a print function, or a scan and send function.

10. The image processing apparatus according to claim 1, wherein the user operation on the transparent window superimposed at the surface over the first setting screen is a touch operation.

11. A control method implemented by an image processing apparatus having a plurality of functions including a predetermined function, the control method comprising:

receiving a user operation on a display including a touch panel;

receiving a display instruction for displaying a screen related to the predetermined function; and displaying the screen related to the predetermined function on the display, wherein in a case where receiving the display instruction for displaying a first setting screen on which a setting value related to the predetermined function is displayed, displays a transparent window having a same size as the first setting screen and capable of receiving a touch operation in a superimposed manner on the first setting screen at a surface over the first setting screen on the display, based on authentication processing for enabling a user operation for the setting value related to the predetermined function to be used being required, and in a case where a user operation on the is received, displays an authentication screen capable of receiving the authentication processing on the display, and, when the authentication processing that is based on authentication information inputted on the authentication processing is successful and an authority of user information that is based on the authentication information with which the authentication processing is successful is an authority that allows the predetermined function to be used, the first setting screen is displayed at the surface of the display without superimposing the transparent window, thereon, based on the authentication processing being not required in the case where receiving the display instruction for displaying the first setting screen on the setting value related to the predetermined function is displayed, not displaying the transparent window, when the authority of the user information that is based on the authentication information with which the authentication processing is successful is not an authority that allows the predetermined function to be used, keeping the transparent window displayed in a superimposed manner on the first setting screen at the surface over the first setting screen on the display, a user operation for the setting value related to the predetermined function is disabled on the first setting screen in a case where the transparent window is superimposed on the first setting screen and where the first setting screen is not displayed at the surface on the display, and a user operation for the setting value related to the predetermined function is not enabled on the first setting screen in a case where the transparent window is not superimposed on the first setting screen and where the first setting screen is displayed at the surface on the display.

12. A non-transitory computer-readable storage medium storing a program for causing a computer to execute a control method implemented by an image processing apparatus having a plurality of functions including a predetermined function, the control method comprising:

receiving a user operation on a display including a touch panel;

receiving a display instruction for displaying a screen related to the predetermined function; and displaying the screen related to the predetermined function on the display, wherein in a case where receiving the display instruction for displaying a first setting screen on which a setting value related to the predetermined function is displayed, displays a transparent window having a same size as the first setting screen and capable of receiving a touch operation in a superimposed manner on the first setting screen at a surface over the first setting screen on the display, based on authentication processing for enabling a user operation for the setting value related to the predetermined function being required, and in a case where a user operation on the is received, displays an authentication screen capable of receiving the authentication processing on the display, and, when the authentication processing that is based on authentication information inputted on the authentication processing is successful and an authority of user information that is based on the authentication information with which the authentication processing is successful is an authority that allows the predetermined function to be used, the first setting screen is displayed at the surface of the display without superimposing the transparent window, thereon, based on the authentication processing being not required in the case where receiving the display instruction for displaying the first setting screen on the setting value related to the predetermined function is displayed, not displaying the transparent window, when the authority of the user information that is based on the authentication information with which the authentication processing is successful is not an authority that allows the predetermined function to be used, keeping the transparent window displayed in a superimposed manner on the first setting screen at the surface over the first setting screen on the display, a user operation for the setting value related to the predetermined function is disabled on the first setting screen in a case where the transparent window is superimposed on the first setting screen and where the first setting screen is not displayed at the surface on the display, and a user operation for the setting value related to the predetermined function is not enabled on the first setting screen in a case where the transparent window is not superimposed on the first setting screen and where the first setting screen is displayed at the surface on the display.

* * * * *